(No Model.)  R. M. & J. M. BROOKS.  2 Sheets—Sheet 1.
SEED PLANTER AND FERTILIZER DISTRIBUTER.
No. 325,496.  Patented Sept. 1, 1885.

WITNESSES
Edwin L. Jewell.
J. J. McCarthy.

INVENTOR
Rhodom M. Brooks
J. M. Brooks
By ____ Alexander, Attorney (No Model.) 2 Sheets—Sheet 2.

R. M. & J. M. BROOKS.
SEED PLANTER AND FERTILIZER DISTRIBUTER.

No. 325,496. Patented Sept. 1, 1885.

WITNESSES
Edwin L. Jewell
J. J. McCarthy

INVENTOR
Rhodom M. Brooks
J. M. Brooks
By ___ Alexander
Attorney

UNITED STATES PATENT OFFICE.

RHODOM M. BROOKS AND JAMES M. BROOKS, OF JENKINSVILLE, GEORGIA.

SEED-PLANTER AND FERTILIZER-DISTRIBUTER.

SPECIFICATION forming part of Letters Patent No. 325,496, dated September 1, 1885.

Application filed November 28, 1884. (No model.)

*To all whom it may concern:*

Be it known that we, RHODOM M. BROOKS and JAMES M. BROOKS, citizens of the United States, residing at Jenkinsville, in the county of Pike and State of Georgia, have invented certain new and useful Improvements in Seed-Planters and Fertilizer-Distributers, of which the following is a specification, reference being had therein to the accompanying drawings.

Our invention relates to improvements in seed-planters, and is designed to produce a device for the proper distribution of seed and fertilizer, that shall be of easy draft and even, steady motion. The planter is so constructed that stones or uneven ground do not appreciably affect it.

Figure 1:
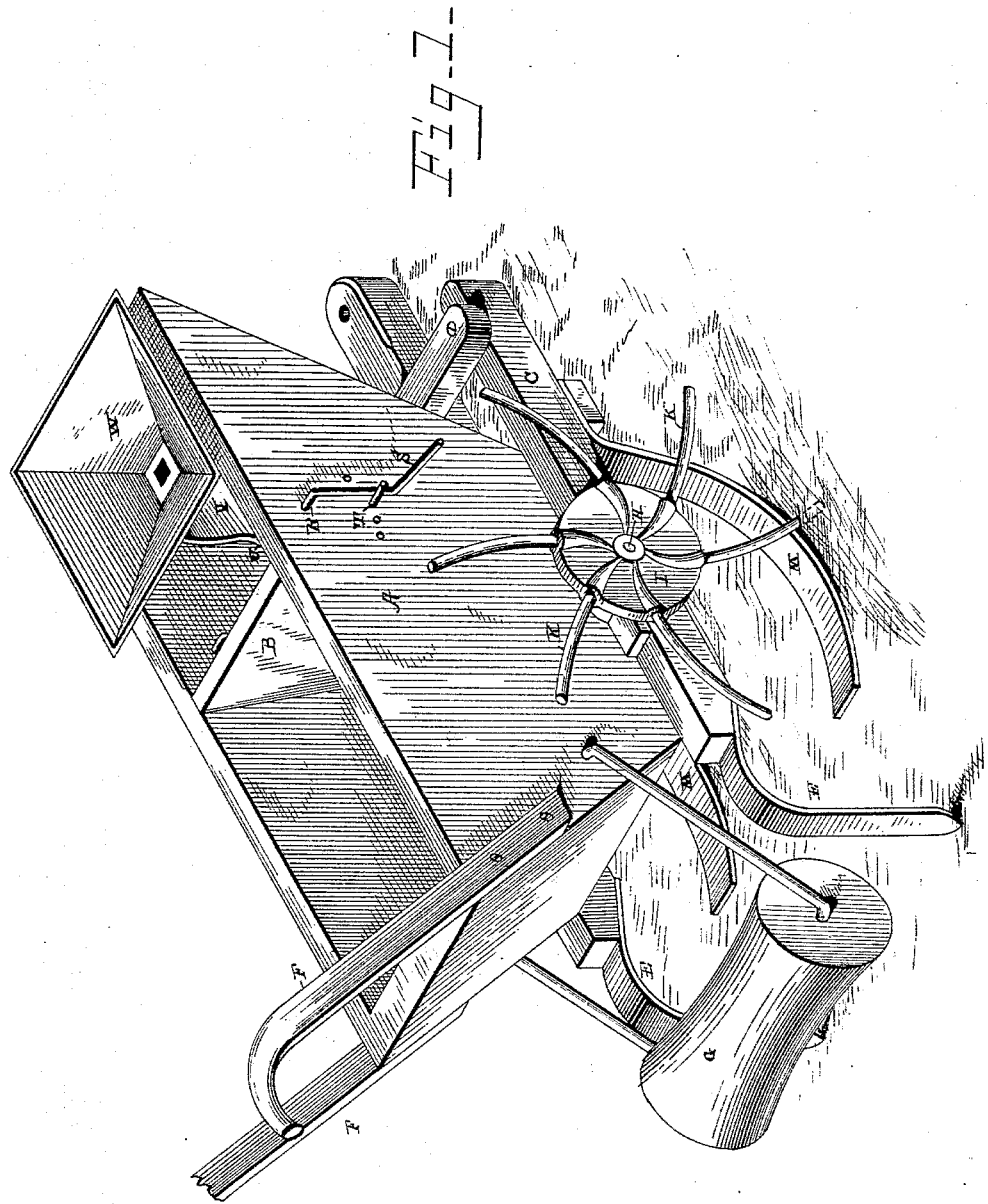
Figure 2:
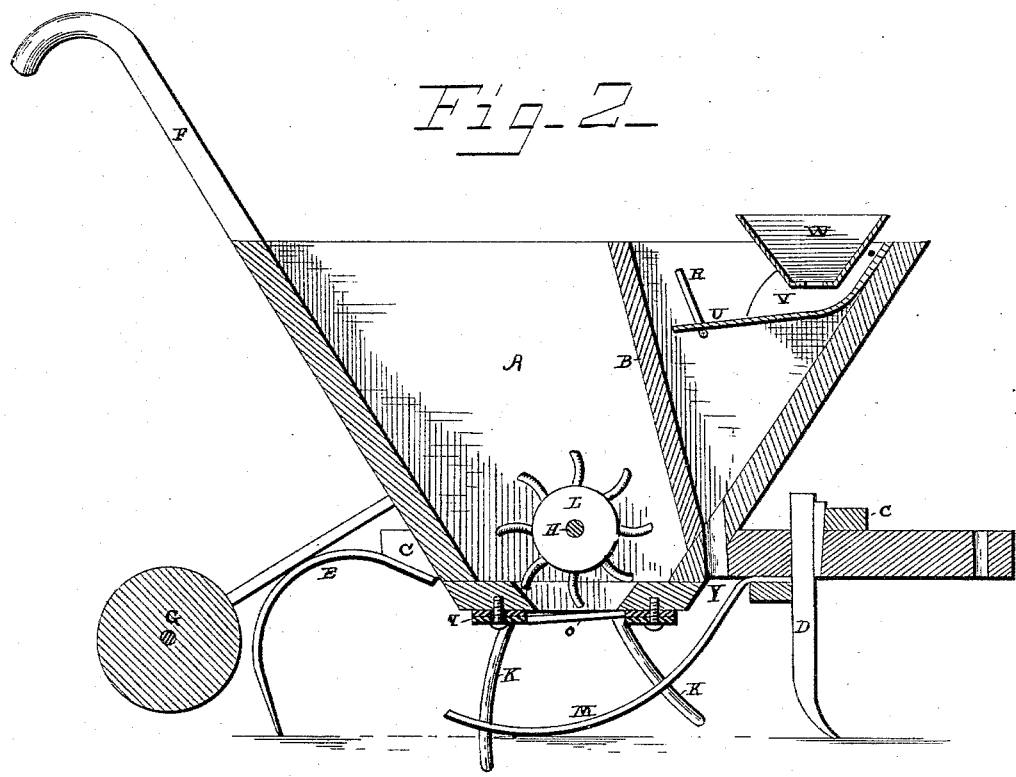
Figure 3:
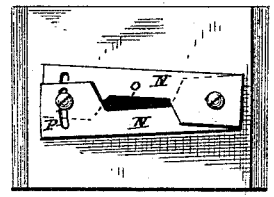

In describing the device reference is had to the annexed drawings, in which Figure 1 represents a perspective view; Fig. 2, a longitudinal section; Fig. 3, a bottom view, and Fig. 4 an elevation of the opener.

A designates a box or hopper, having a partition, B. The hopper rests in a frame, C, having at its front end a tongue and an opener, D, and at its rear end coverers E. The hopper has handles F secured to it and also a pivoted roller, G, operating behind the coverers E. An axle-shaft, H, passes through the hopper near its bottom, and is journaled on the frame C. On each end of the axle is a rimless wheel, having a hub, I, and curved spokes K.

The spokes may be of wrought-iron, set in or cast in a cast-iron hub.

The wheels are secured to the axle, preferably by being screwed on.

Within the hopper on the axle is a stirrer, L.

The spokes in operation will sink somewhat in the ground, and the planter will travel on spring-runners M. Should the spokes strike an unevenness in the field over which the planter is traveling, they will enter it and the spring-runners yield to it without jarring or otherwise affecting the machine. The wheels being without rims, stones seldom interfere in any way with them.

The orifice under the stirrer is adjustably restricted as to size by pieces or plates N, having each a recess, O, in one side. One end is perforated, and the other slotted at P.

The perforated ends are placed one above the other at the front end of the orifice under the stirrer, and are there pivoted by a screw or bolt. The slotted ends are then so placed that the plate uppermost at the front is under at the rear—or, in other words, the plates are crossed longitudinally at their slotted portions. A screw or bolt passes through the slots, and thereby admits the adjusting of the said plates. The slots make the orifice wider at the rear than at the front. This facilitates the dropping of the fertilizer or seed.

At the front end of the upper portion of the hopper is hung a rod, R, it projecting through one side and bent downward into an L-arm, (indicated by the letter S.) The spokes of one of the wheels engage with this arm and operate it, a stop, T, adjustably restricting its throw. The rod R engages with the spout U of a funnel, V, hinged or pivoted under a hopper, W, on top the box A. The spout U has its lowest part on one side, so as to throw the seed off that side, from whence it falls through an orifice, Y, in the bottom of the box A.

As the wheels revolve, the spout and funnel are given an up-and-down throw, thus delivering the seed in small quantities to the ground.

The partition B may be dispensed with, and the device used as a cotton-seed planter.

Figure 4:
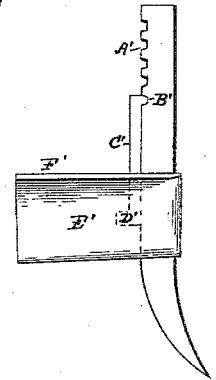

The opener D, Fig. 4, has at its upper end a series of notches, A', in which fit a lug, B', on a bar, C', it having also a lug, D', at the other end and projecting in a diametrically opposite direction.

A smoother, E', with projecting flanges F', embraces the opener, and is adjustable thereon by means of the bar C', its lug D' fitting in an internal recess in the said smoother. The smoother travels in the furrow, and prevents the furrow being filled by the earth returning to it, and also enables the coverer to perform its work perfectly.

What we claim is—

1. The combination, with the hopper and frame mounted on spring-runners, of the axle and distributer, and the rimless wheels, arranged to operate substantially in the manner specified.

2. The combination, with the hopper and frame mounted on spring-runners, of the axle, the rimless wheels, and the seed-distributing devices operated thereby, substantially as and for the purposes set forth.

3. The combination, with the opener, of the adjustable smoother attached to the same and having horizontal lateral flanges, the said smoother being adapted to travel in the furrow and prevent filling until the seeds have been deposited therein, substantially as specified.

In testimony whereof we affix our signatures in presence of two witnesses.

R. M. BROOKS.
JAMES M. BROOKS.

Witnesses:
 JAS. L. DRIVER,
 I. H. BAKER.